Patented Feb. 27, 1940

2,191,738

UNITED STATES PATENT OFFICE 2,191,738

HIGH-MOLECULAR POLYCARBOXYLIC ACID AMIDES AND THEIR PRODUCTION

Gerhard Balle, Frankfort-on-the-Main, Germany, assignor to I. G. Farbenindustrie Aktiengesellschaft, Frankfort-on-the-Main, Germany No Drawing. Application August 28, 1935, Serial No. 38,215. In Germany September 1, 1934

22 Claims. (Cl. 260—534)

The present invention relates to a process for the production of agents suitable as washing, dispersing or wetting agents.

The instability to lime and acid of the soaps employed especially as washing agents is generally speaking referable to the presence of the carboxyl groups. In the preparation of washing agents which are not to have the said fault, attempts are therefore made to replace the carboxyl groups by sulphonic or sulphuric ester groups.

I have now found that washing, wetting, emulsifying and like agents which can be employed in neutral and even slightly acid baths and which yield no deposits when employed in water of the usual hardness can be obtained by causing primary or secondary amines containing at least one high molecular aliphatic radicle to react with polycarboxylic acid compounds to form carboxylic acid amides which contain at least one free carboxyl group in the molecule. In the present case the expression "aliphatic radicle" comprises also cycloaliphatic radicles. In this manner products of the following general formula are obtained:

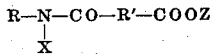

wherein R stands for a high molecular weight aliphatic radicle which may be interrupted by other atoms than carbon atoms, X stands for hydrogen or any organic radicle and R' stands for a single valency or an alkylene or arylene radicle; Z represents an alkali metal or an —NH₄ or quaternary ammonium group. Especially when employing secondary amines which contain not only an aliphatic radicle of high molecular weight but also an aliphatic radicle of low molecular weight attached to nitrogen, products are obtained which are soluble even in comparatively hard water. The presence of double linkages or halogen atoms in the aliphatic radicles of high molecular weight frequently improves the advantageous properties of the products to such an extent that the products remain in solution even in water of the highest degree of hardness met with in practice.

Suitable amines containing aliphatic radicles according to this invention are especially those containing an aliphatic radicle having from 8 to 18 carbon atoms. Such amines may be prepared from fatty substances of vegetal origin, as for example amines corresponding to the fatty acids contained in palm kernel oil, coconut oil, soy bean oil, rapeseed oil, poppy-seed oil, tallow, train oil, tall oil or sperm oil, as for example octylamine, dodecylamine, myristylamine, cetylamine or oleylamine. In many cases mixtures of amines containing a high molecular aliphatic radicle, such as can be obtained from mixtures of fatty acids contained in oils or fats are also suitable as initial materials. The said amines which are, however, substituted on the nitrogen by methyl, ethyl, hydroxyalkyl or benzyl groups may also be used.

The carbon chain of the said amines may furthermore be interrupted by other atoms, as for example oxygen or sulphur atoms or by atomic groups, such as —SO₂—, —O—SO₂—, —SO₂—O—, —CO—NH—, —NH—CO—, —SO₂—NH—, —NH—SO₂—, —NH—CO—NH—, —NH—CS—NH—,

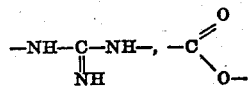

and

groups.

Cycloaliphatic amines suitable as initial materials are for example abietylamine and the amines corresponding to the naphthenic acids. The aliphatic radicle combined with the nitrogen atom may also be substituted, for example by halogen atoms, hydroxy or nitro groups. The preparation of amines containing halogen may be carried out for example by the reaction of corresponding unsaturated amines or hydroxyamines with hydrogen halides or by partial exchange of halogen in compounds halogenated in more than one place. For the process according to this invention only amines containing in the molecule 8 or more aliphatic combined carbon atoms are employed. Condensation products of the said kind from amines containing aliphatic radicles of comparatively low molecular weight and polycarboxylic acids, as for example the condensation products from dicyclohexylamine, are especially suitable as wetting agents while the products derived from fatty amines constitute very good washing, emulsifying and softening agents.

As polycarboxylic acid compounds may be mentioned for example oxalic acid or other aliphatic or aromatic polycarboxylic acids, as for example maleic acid, malonic acid, succinic acid, tartaric acid, citric acid or adipic acid, or polycarboxylic acids interrupted by atoms or atomic groups, as for example diglycollic acid or thiodiglycollic acid.

For the reaction, the acids may be employed as such or in the form of their acid alkali metal salts. It is preferable to remove the water formed during the reaction from the mixture by azeotropic distillation. Derivatives of the carboxylic acids, as for example the ester, are also very well suited as initial materials because the acid amide esters formed can be readily saponified to form the corresponding salts. Anhydrides may also be employed, but when employing anhydrides which tend to form ring compounds, as for example phthalic anhydride, secondary amines are advantageously employed as the second component of the reaction. Generally speaking the employment of a corresponding excess of the polycarboxylic acids or their derivatives is preferable.

The condensation of the said amines with the polycarboxylic acids may be carried out by simply heating the two components somewhat in an equimolecular proportion until the reaction is complete. Generally speaking temperatures of between 60° and 250° C., preferably between 100° and 200° C. may be employed. In many cases organic solvents or diluents which do not react with either of the initial substances may be added with advantage. Suitable solvents or diluents are for example benzine, chlorinated low molecular hydrocarbons, aliphatic or cycloaliphatic alcohols, or ketones and the like. If the esters of the polycarboxylic acids to be employed for the condensation with the amines as described above are liquid at normal temperature or have a comparatively low melting point, these esters may be employed in a moderate excess thus serving as solvents or diluents.

The products obtained in the said manner may be employed directly as such or after further reactions. The free acids are preferably converted into their readily soluble salts, as for example alkali metal, ammonium, amine, or hydroxyalkylamine salts, when they are to be employed as wetting and like agents. The products may be employed alone or together with protective colloids, such as glue, or albuminous degradation products, or salts, as for example sodium carbonate, sodium phosphate, sodium pyrophosphate or metaphosphate, perborates or waterglass. They are especially suitable for washing and cleansing textile and like materials, for the emulsification of substances which are insoluble in water, as for example oils, fats and waxes, and as wetting agents. The products may also frequently be employed as softening agents for textiles. The addition of the products to dyebaths causes a good wetting of the goods to be dyed and also frequently an improvement in the levelness. The products are especially suitable for washing wool because, in the same way as the soaps, they are caused to separate by acidification with strong mineral acids and the recovery of wool grease is thereby rendered possible. In the case of fulling baths also, the addition of the said products offers advantages; the same is true of the degumming of silk and many other processes in the textile, leather, paper and like industries.

The following examples will further illustrate the nature of this invention but the invention is not restricted to these examples. The parts are by weight.

*Example 1*

100 parts of oleylmethylamine and 500 parts of diethyl oxalate are heated to boiling for three hours and the excess of ester is then distilled off in vacuo. The reaction product is saponified in the cold in alcoholic solution while employing caustic soda solution in slight excess. Any small amount of insoluble products present is filtered off and the whole evaporated. Oleylmethyloxamic acid sodium salt is obtained in a good yield. The product has a very good wetting and washing power and is of good stability to dilute acetic acid and hard water.

*Example 2*

100 parts of an amine obtainable by the reaction of the bromide of the alcohols corresponding to the fatty acids in palm kernel oil and methylamine are caused to react with 500 parts of diethyl oxalate in the manner described in Example 1. After saponifying the condensation product, a good yield of a product is obtained which constitutes an excellent washing agent, especially in baths containing inorganic salts.

*Example 3*

100 parts of an amine mixture obtainable from the alcohols of sperm oil are caused to react with 500 parts of oxalic acid diethyl ester in the manner described in Example 1. Saponification is effected by means of triethanol amine in aqueous alcoholic solution and the resulting salt is obtained by evaporating the alcoholic solution. It is especially suitable as a softening agent for textiles.

*Example 4*

37 parts of maleic anhydride are added while stirring to 100 parts of the mixture of amines obtained by the reaction of the bromides of the alcohols corresponding to the fatty acids of coconut oil with methylamine, the temperature thus rising to 90° C. and being kept at this temperature by appropriate cooling. The product thus obtained is dissolved in 50 per cent alcohol and neutralized with caustic soda solution. Any small amounts of by-products are removed by treatment with ligroin and the resulting solution is evaporated. A very good dispersing agent is obtained which is very stable to comparatively hard water.

*Example 5*

50 parts of dicyclohexylamine and 50 parts of phthalic anhydride are heated while stirring to about 50° C., the reaction thus taking place with an increase in temperature. The reaction mixture is stirred for another hour at 100° C. whereby it gradually becomes solid. Sufficient alcohol is added to cause dissolution of the product and the solution is neutralized with caustic potash solution and diluted with an equal volume of water. Any small amounts of by-products present are removed by extraction with benzine and the solution evaporated to dryness. The potassium salt of dicyclohexylphthalamic acid thus obtained is readily soluble even in hard water and has a good wetting power.

*Example 6*

100 parts of a mixture of amines obtainable by catalytic hydrogenation of lauric acid nitrile in the presence of methylamine are caused to react with 500 parts of oxalic acid diethyl ester in the manner described in Example 1. The condensation product is saponified and any small amounts of insoluble by-products are removed by means of petroleum ether. By evaporating the solution, a product having excellent washing power is obtained.

*Example 7*

100 parts of an amine obtained by causing the sulphuric ester of ethylene glycol monododecyl ether in the form of its sodium salt to react with ethanol amine

are caused to react with 500 parts of diethyl oxalate in the manner described in the preceding examples. The condensation product remaining behind after distilling off the excess of ester is saponified in the cold by means of alcoholic caustic soda solution. After removing small amounts of insoluble products and neutralizing the solution, a product having a good washing power is obtained by evaporation.

The monododecyl diethanolamine ether may also be replaced by the corresponding thioether obtainable from dodecyl mercaptan. In this way a product having similar properties is obtained.

Instead of the said amines, the carbon chain of which is interrupted by an oxygen or a sulphur atom, amines having a higher molecular weight may also be employed as starting materials, the carbon chain of which is interrupted by the groups

or

in which X represents hydrogen or any organic radicle.

Example 8

100 parts of mono-oleic acid ethylene diamide of the formula $C_{17}H_{33}.CO.NH.CH_2.CH_2.NH_2$ are condensed with 500 parts of diethyl oxalate in the manner described in Example 1. A very good washing agent is obtained.

Example 9

100 parts of an amine obtained by reacting the sulphuric acid ester of oleyl alcohol in the form of its sodium salt with triethylene tetramine, are condensed with 500 parts of diethyl oxalate. After distilling off the excess of ester the residue is dissolved in alcohol and saponified with a slight excess of caustic soda solution. After removing small amounts of by-products the reaction product is neutralized and then evaporated to dryness.

Example 10

100 parts of industrial oleylamine obtained by catalytically hydrogenating oleic nitrile, are heated with 500 parts of oxalic acid diethyl ester for 2 hours under a reflux condenser. The excess of diethyl oxalate is then distilled off in vacuo. The reaction product is diluted with 200 parts of ethyl alcohol and mixed at from 20° to 30° C. with an alcoholic caustic soda solution until the mixture shews an alkaline reaction to phenolphthalein. The product is then worked up according to Example 1. A washing agent is obtained which is eminently suitable for washing textiles soiled by soot, dust or color pigments.

Example 11

A solution of 50 parts of thiodiglycollic acid anhydride in acetone is slowly added at from 30° to 40° C. to a mixture of 100 parts of industrial oleylamine and 300 parts of water, such an amount of concentrated caustic soda solution being simultaneously run in that the paste at any time has a strongly alkaline reaction. A sample of the product obtained is almost clearly soluble in water. By acidifying the solution, separating the precipitate and recrystallizing the latter from alcohol the product may be obtained in a pure state.

The product is adapted for use as a washing agent for textiles.

Example 12

Diglycollic acid anhydride is boiled in an alcoholic solution for 2 to 3 hours together with a little more than the equivalent amount of oleyl amine. After cooling the reaction mixture is neutralized with caustic soda solution and the excess of oleyl amine is removed by extraction with diethyl ether. The resulting neutral solution which contains water and alcohol is then evaporated, a product having a high wetting power and a high stability to hard water thus being obtained.

Example 13

16 parts of ethylene-bis-glycollic acid anhydride obtainable by boiling ethylene-bis-glycollic acid with acetic anhydride for from 5 to 6 hours are fused with 26 parts of oleyl amine at 100° C. while stirring. After cooling the reaction product is dissolved in ethyl alcohol and neutralized with caustic soda solution. The further treatment is carried out as described in Example 12. The resulting product is an excellent washing agent which is not precipitated even in water having a hardness of 100° (German scale). The term "hardness of 1°" (German scale) means that 1 liter of water contains 10 milligrams of calcium oxide. Therefore a water with a hardness of 100° (German scale) contains in 1 liter 1000 milligrams of calcium oxide.

Example 14

16 parts of ethylene-bis-glycollic acid anhydride and 26 parts of stearyl amine are dissolved in 150 parts of ethyl alcohol and boiled for 2 to 3 hours under reflux. After cooling the reaction mixture is neutralized and treated in the manner indicated in Example 12. The resulting product has a good wetting power and is not precipitated even in water containing calcium compounds.

Instead of stearyl amine there may also be employed the corresponding amount of dodecyl amine. The product thus obtained possesses properties which are similar to those of the product obtained by the employment of stearyl amine.

Example 15

120 parts of diglycollic acid anhydride are added to 199 parts of dodecylmethyl amine, whereby the temperature of the mixture rises to about 90° C., if necessary the reaction may be initiated by slight pre-heating. The reaction mixture is kept at the said temperature until the resulting reaction product when dissolved in a solution of sodium carbonate gives a clear solution. The alkali metal salts of the diglycollic acid monododecylmethyl amide thus obtained has soap-like properties and a particularly good washing power.

Example 16

300 parts of an amine mixture obtainable by the catalytic hydrogenation of the nitriles prepared from hydrogenated train oil fatty acids are heated together with 150 parts of dilactic anhydride to about 100° C. After a short time the resulting reaction product dissolves in a solution of sodium carbonate forming the corresponding sodium salt. The said sodium salt has marked soap-like properties and an excellent washing and dispersing power.

What I claim is:

1. The process for the production of agents suitable as assistants for the textile industry which comprises causing an amine containing at least one free hydrogen atom attached to nitrogen and at least one high molecular weight aliphatic radicle, to react with at least an equimolecular amount of a polycarboxylic acid compound at a temperature which leads to the formation of carboxylic amides without the formation of salts.

2. The process for the production of agents suitable as assistants for the textile industry which comprises causing an amine containing at least one free hydrogen atom attached to nitrogen and at least one high molecular weight aliphatic radicle which radicle is interrupted by at least one non-carbon atom, to react with at least an equimolecular amount of a polycarboxylic acid compound at a temperature which leads to the formation of carboxylic amides without the formation of salts.

3. The process for the production of agents suitable as assistants for the textile industry which comprises causing an amine containing at least one free hydrogen atom attached to nitrogen and at least one high molecular weight aliphatic radicle, to react with at least an equimolecular amount of dicarboxylic acid compound containing from 2 to 6 carbon atoms in the acid radicle at a temperature which leads to the formation of carboxylic amides without the formation of salt.

4. The process for the production of agents suitable as assistants for the textile industry which comprises causing 1 molecular proportion of oleyl-N-methyl amine to react with at least 1 molecular proportion of oxalic acid diethyl ester at a temperature which leads to the formation of carboxylic amides without the formation of salts and subsequently saponifying the ester group of the condensation product formed.

5. The process for the production of agents suitable as assistants for the textile industry which comprises causing 1 molecular proportion of an aliphatic amine containing at least one free hydrogen atom attached to nitrogen and an aliphatic radicle with from 8 to 18 carbon atoms to react at a temperature which leads to the formation of carboxylic amides without the formation of salts with at least one molecular proportion of a dicarboxylic acid anhydride of the general formula

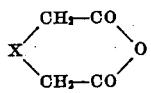

wherein X stands for oxygen or sulphur.

6. Oxalic acid amides containing at least one high molecular weight aliphatic radicle attached to the nitrogen atom and an unaltered carboxylic acid group.

7. A mixture of oxalic acid amides containing at least one high molecular weight aliphatic radicle corresponding to the fatty acids contained in fatty substances of vegetal origin attached to nitrogen and one unaltered carboxylic acid group.

8. The process for the production of agents suitable as assistants in the textile industry which comprises causing an amine containing at least one free hydrogen atom attached to nitrogen and at least one high molecular weight aliphatic radicle, to react with at least an equimolecular amount of a dicarboxylic acid compound at a temperature which leads to the formation of carboxylic amides without the formation of salts.

9. The process for the production of agents suitable as assistants in the textile industry which comprises causing an amine containing at least one free hydrogen atom attached to nitrogen and at least one high molecular weight aliphatic radicle, to react with at least an equimolecular amount of an aromatic dicarboxylic acid compound at a temperature which leads to the formation of carboxylic amides without the formation of salts.

10. The process for the production of agents suitable as assistants in the textile industry which comprises causing an amine containing at least one free hydrogen atom attached to nitrogen and at least one high molecular weight aliphatic radicle, to react with at least an equimolecular amount of a phthalic acid compound at a temperature which leads to the formation of carboxylic amides without the formation of salts.

11. The process for the production of agents suitable as assistants in the textile industry which comprises causing an amine containing at least one free hydrogen atom attached to nitrogen and at least one aliphatic radicle containing from 8 to 18 carbon atoms to react with at least an equimolecular amount of a phthalic acid compound at a temperature which leads to the formation of carboxylic amides without the formation of salts.

12. The process for the production of agents suitable as assistants in the textile industry which comprises causing a secondary amine containing at least one aliphatic radicle containing from 8 to 18 carbon atoms to react with at least an equimolecular amount of a phthalic acid compound at a temperature which leads to the formation of carboxylic amides without the formation of salts.

13. The process for the production of agents suitable as assistants in the textile industry which comprises causing an amine containing at least one free hydrogen atom attached to nitrogen and at least one high molecular weight aliphatic radicle, to react with at least an equimolecular amount of an aliphatic dicarboxylic acid compound at a temperature which leads to the formation of carboxylic amides without the formation of salts.

14. The process for the production of agents suitable as assistants in the textile industry which comprises causing an amine containing at least one high molecular weight aliphatic radicle, to react with at least an equimolecular amount of an aliphatic dicarboxylic acid compound with non-interrupted carbon chain of at most 4 carbon atoms at a temperature which leads to the formation of carboxylic amides without the formation of salts.

15. The process for the production of agents suitable as assistants in the textile industry which comprises causing an amine containing at least one high molecular weight aliphatic radicle, to react with at least an equimolecular amount of an aliphatic dicarboxylic acid compound with a carbon chain of at most 4 carbon atoms interrupted by non-carbon atoms at a temperature which leads to the formation of carboxylic amides without the formation of salts.

16. The process for the production of agents suitable as assistants in the textile industry which comprises causing an amine containing at least one free hydrogen atom attached to nitrogen and at least one high molecular weight aliphatic radicle, to react with at least an equimolecular amount of an aliphatic dicarboxylic acid compound with a carbon chain of at most 4 carbon atoms interrupted by a divalent atom at a temperature which leads to the formation of carboxylic amides without the formation of salts.

17. The process for the production of agents suitable as assistants in the textile industry which comprises causing an amine containing at least one free hydrogen atom attached to nitrogen and at least one high molecular weight aliphatic radicle, to react with at least an equimolecular amount of a dicarboxylic acid anhydride of the general formula

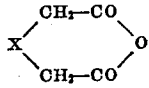

wherein X stands for oxygen or sulphur, at a temperature which leads to the formation of carboxylic amides without the formation of salts.

18. The process for the production of agents suitable as assistants in the textile industry which comprises causing an amine containing at least one free hydrogen atom attached to nitrogen and at least one aliphatic radicle containing from 8 to 18 carbon atoms to react with at least an equimolecular amount of an oxalic acid ester at a temperature which leads to the formation of carboxylic amides without the formation of salts.

19. The process for the production of agents suitable as assistants for the textile industry which comprises causing one molecular proportion of an amine containing at least one free hydrogen atom and at least one radicle corresponding to the fatty acids of vegetal origin to react with at least an equimolecular amount of oxalic acid ester at a temperature which leads to the formation of carboxylic amides without the formation of salts.

20. The process for the production of agents suitable as assistants for the textile industry which comprises causing one molecular proportion of an amine containing at least one free hydrogen atom and at least one radicle corresponding to the unsaturated fatty acids of vegetal origin to react with at least an equimolecular amount of oxalic acid ester at a temperature which leads to the formation of carboxylic amides without the formation of salts.

21. Polycarboxylic acid mono-amides of the general formula:

wherein R stands for a high molecular weight aliphatic radicle, $R_1$ stands for a member of the group consisting of hydrogen, a lower alkyl, a lower hydroxy-alkyl and a benzyl radicle, A stands for the radicle of a low molecular weight aliphatic polycarboxylic acid which is attached to the N-atom through one of its carboxyl groups and which contains at least one free carboxyl group.

22. Dicarboxylic acid mono-amides of the general formula:

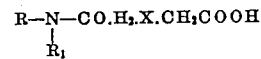

wherein R stands for a high molecular weight aliphatic radicle, $R_1$ stands for a member of the group consisting of hydrogen, a lower alkyl, a lower hydroxy-alkyl and a benzyl radicle and X stands for a member of the group consisting of oxygen and sulphur.

GERHARD BALLE.

CERTIFICATE OF CORRECTION.

Patent No. 2,191,738.

February 27, 1940.

GERHARD BALLE.

It is hereby certified that error appears in the printed specification of the above numbered patent requiring correction as follows: Page 5, second column, line 30, claim 22, in the formula, for "$CO.H_2$" read --$CO.CH_2$--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.